Patented Sept. 10, 1935

2,013,791

UNITED STATES PATENT OFFICE 2,013,791

BROMINATION OF AROMATIC COMPOUNDS

John H. Sachs, Wilmington, Del., and Ferdinand W. Peck, Pennsgrove, N. J., assignors to E. I. du Pont de Nemours & Company, Wilmington, Del., a corporation of Delaware No Drawing. Application October 18, 1934, Serial No. 748,888

9 Claims. (Cl. 260—61)

This application is a continuation in part of our co-pending application, Serial No. 566,792, filed October 3, 1931.

In said copending application, we have disclosed a novel process of brominating saturated organic compounds using chlorine under pressure to regenerate bromine from the hydrobromic acid formed in the reaction. The specific examples of said application are, however, limited to the bromination of pyranthrone. Our present application deals with an extension of said invention to various other fields.

We have found that our invention is specifically applicable to a wide field of substances, and is indeed applicable generally to any aromatic or aliphatic compound which undergoes bromination readily. It will be understood that we are not claiming that by our process bromination will proceed where it otherwise would not; but we believe that in cases where bromination does proceed in general, our process is more economical, because it forces a complete consumption of the bromine instead of letting half of it be wasted in the form of hydrobromic acid. Our process has also other advantages, as more fully discussed below.

It is accordingly an object of our invention to provide an efficient method for brominating aromatic compounds having replaceable hydrogen atoms. It is a further object of our invention to provide a process for regenerating bromine from the hydrobromic acid formed during such reaction, whereby said bromine becomes available for further reaction with the aromatic compound. A still further object of our invention is to provide a process for brominating aromatic compounds wherein the bromine consumed in the formation of hydrobromic acid is regenerated by the aid of chlorine gas. Other and further important objects of our invention will appear as the description proceeds.

We accomplish the objects of our invention by dissolving or suspending the aryl compound to be brominated, for instance an anthraquinone compound or a vat dyestuff of the anthraquinone or indigoid series, in a suitable solvent, such as nitrobenzene or concentrated sulfuric acid, and treating it in this solution in a pressure vessel with liquid bromine, preferably in the presence of a halogenation catalyst, such as iodine. The vessel is then sealed, chlorine gas is pumped in under pressure, and the reaction is continued, preferably at moderately elevated temperature, for several hours, or until a test sample shows that the reaction is complete.

The quantity of bromine used in the above reaction is but slightly in excess of the theoretical quantity required for introducing the desired amount of bromine. The quantity of chlorine should be at least equal to half the molal ratio of the bromine employed, and may be in considerable excess thereover.

The surprising effect here is the neatness of the reaction and the purity of the product, for although chlorine is present in the mass throughout the reaction, the product as a rule contains but negligible quantities of chlorine, if at all. Exceptions to this rule are found only in cases of compounds which are in general very difficult to brominate, and which require therefore more drastic conditions for the halogenation, thereby increasing the tendency of chlorine as well as of bromine to enter the aryl molecule.

We have also found that the halogenation can be effected in an indifferent solvent such as dichlorobenzene or nitrobenzene, if the reaction is carried out in an enamel-lined or nickel vessel.

Without limiting our invention to any particular procedure, the following examples are given to illustrate our preferred mode of operation. Parts mentioned are by weight; pressures mentioned are gauge pressures.

Example I 300 parts of pyranthrone are dissolved in 3,000 parts of sulfuric acid of 96 to 99.5% strength, contained in a cast iron vessel which can be closed and subjected to pressures up to 150 pounds per square inch. Three parts of iodine and 136 parts of bromine are then added, which quantity corresponds to an 18% excess over that required by the following formula where $RH_2$ represents the pyranthrone molecule

$$RH_2 + Br_2 + Cl_2 \rightarrow RBr_2 + 2HCl$$

The vessel is closed and through a valve there is added 60 parts of chlorine whereby a pressure of 80 to 85 pounds develops when the temperature is raised to 50 to 55° C. The mixture is held at this temperature under agitation for twenty-four hours and then blown into water. The product, which is substantially a dibrompyranthrone, separates in bright reddish orange microscopic crystals which are filtered off, washed with water, and dried, or converted into a paste by well known means. When dry, the product is a bright reddish orange powder which dyes cotton from a hydrosulfite vat in reddish violet shades. On oxidation by means of air, the shade changes to a bright reddish orange. The product contains 26 to 27% of bromine and 1 to 2% of chlorine.

Example II 300 parts of pyranthrone are suspended in 3,000 parts of nitrobenzene contained in a nickel vessel which can be tightly closed and which will stand a working pressure of 150 pounds per square inch. 135 parts of bromine are added, the vessel is closed and through a valve 60 parts of chlorine are added, whereby a pressure of 50 to 60 pounds develops when the temperature is raised to 50 to 55° C. The mass is allowed to agitate at this temperature until a test portion shows that the bromine content is between 25 and 27.5%. The pressure is released, the nitrobenzene is distilled with steam, and the product filtered off, washed with water and dried. It is identical with that obtained according to Example I.

Example III 375 parts of β-amino-anthraquinone are dissolved in 3,600 parts of 93% sulfuric acid in a steel pressure vessel equipped with agitation and a jacket for heating or cooling. To this acid solution are added 3.7 parts of iodine and 289 parts of bromine, this amount being slightly in excess of that necessary to produce a dibrom-2-amino anthraquinone. The vessel is sealed and heated to 75 to 85° C., and at this point chlorine gas is introduced until a pressure of 40 to 50 pounds per square inch is obtained. The charge is stirred 16 to 20 hours; the pressure is then released, and the mass is cooled and drowned in water to give a final acid concentration of 15 to 20%. It is then filtered, washed acid-free, and dried. The material obtained contains 37% bromine and .02% chlorine. Theory for dibrom-amino-anthraquinone is 41.75% bromine. This product dissolves in concentrated sulfuric acid, giving a brownish yellow color, distinguished from the greenish-yellow solution of β-amino-anthraquinone. Vatted with caustic soda and sodium hydrosulfite, it gives a cherry-red solution, while β-amino-anthraquinone one gives an orange-red color in the same medium.

Example IV

Charge into a vessel such as is used in Example III, 3,600 parts of 93% sulfuric acid and 375 parts of dibrom-indigo, which analyzes 35.9% bromine and 1.4% chlorine. Add 3.7 parts of iodine followed by 160 parts of bromine, this being about 15% in excess over the amount necessary to convert the dibrom-indigo into tetra-brom-indigo. Close the vessel and heat to 75 to 80° C., and when it has reached this temperature, introduce chlorine gas over the liquid until a pressure of 40 to 50 pounds per square inch is obtained. Hold at this temperature for 20 hours, and at the end of this time release the pressure and drown the charge in 15,000 parts of boiling water. Filter off the color and wash acid-free. The product obtained analyzes 45% bromine and 4% chlorine. The color dissolves in concentrated sulfuric acid to a greenish-blue solution. It dissolves in caustic and hydrosulfite to an orange-yellow vat.

The yield is practically theoretical.

In a similar way indigo may be brominated to dibrom-indigo, but it is necessary to use a much weaker sulfuric acid to prevent sulfonation.

Example V

Charge into a steel bromination vessel 3,600 parts of 99 to 100% sulfuric acid and 375 parts of violanthrone. Also add 3.7 parts of iodine and 184 parts of bromine. Heat the charge to 75 to 85° C., and at this point introduce gaseous chlorine until a pressure of 50 pounds per square inch is obtained. Hold the charge at this pressure and temperature for 12 hours, finally cooling and releasing the pressure. Drown the sulfuric acid solution of brominated violanthrone in water, filter and wash acid-free. The product obtained shows on analysis a bromine content of 26.26% and a chlorine content of 1.23%. It dissolves in concentrated sulfuric acid, giving a red-violet color. It also dissolves in caustic soda and sodium hydrosulfite solution to a red-violet vat from which cotton is dyed a navy blue shade.

Many other organic compounds may be brominated by our improved process, with great facility and economy. Our process is particularly useful in the bromination of dyestuffs and dyestuff intermediates, such as vat dyestuffs of the dibenz-anthrone series, indigoid dyestuffs, thioindigoes, miscellaneous anthraquinone dyestuffs and intermediates. In certain cases special conditions of operation such as temperature, pressure, etc. may have to be resorted to for introduction of the proper amount of bromine without disrupting the molecule; but these special optimum conditions can be readily determined in each individual case by experimentation on a sample of the compound. In the case of bromination in the side chain, the use of enamel-lined or silver-lined vessels may be desirable. Numerous other modifications may be made in respect to time, amount of reagents, and conditions of temperature and pressure without departing from the spirit of our invention.

Our invention possesses marked advantages. The economy resulting from the elimination of the formation of a mol of hydrobromic acid and the subsequent treatment thereof to regenerate the bromine is obvious. A further advantage is that the process is conducted in a closed vessel, thereby eliminating the danger and annoyance resulting from the escape of chlorine and bromine fumes, the toxicity of which is well known. In general, our process results in the formation of products of remarkable purity. This purity in the case of many vat dyestuffs may be enhanced if, after the halogenation, the sulfuric acid solution of the halogenated derivative is diluted to a sulfuric acid solution of about 80 to 85% strength, whereupon the brom derivative crystallizes and is filtered off. It is subsequently hydrolyzed and converted into a paste or powder by well known methods.

Since many embodiments of this invention, differing widely in one or more respects, may be made without departing from the spirit of our invention, it is to be understood that we do not limit ourselves to the foregoing examples or description, except as indicated in the following claims.

We claim:

1. In a process of brominating an organic compound by the aid of bromine, wherein hydrobromic acid is formed as a by-product, the step which comprises regenerating bromine from the hydrobromic acid in situ by the aid of chlorine under pressure.

2. In a process of brominating an aromatic compound having replaceable hydrogen atoms by the aid of bromine in an anhydrous medium, the improvement which comprises effecting the bromination in the presence of chlorine under pressure whereby to regenerate bromine from the hydrobromic acid formed in the reaction.

3. In a process of brominating an aromatic compound of the anthraquinone series having replaceable hydrogen atoms by the aid of bromine in concentrated sulfuric acid, the improvement which comprises feeding chlorine under pressure into the reaction mass whereby to liberate the bromine from the hydrobromic acid formed in the reaction.

4. In a process of brominating a vat dyestuff compound having replaceable hydrogen atoms by the aid of bromine in concentrated sulfuric acid, the improvement which comprises feeding chlorine under pressure into the reaction mass whereby to liberate the bromine from the hydrobromic acid formed in the reaction.

5. The process of brominating an organic compound of the type which brominates by a reaction of exchange, wherein nuclear hydrogen is replaced by bromine and hydrobromic acid is formed as a by-product, which comprises suspending said organic compound in an anhydrous liquid medium containing bromine, in a closed vessel, feeding in chlorine under pressure, and maintaining the reactants under reactive conditions until substantial completion of the reaction.

6. The process of brominating an aromatic compound, which comprises treating the same in a pressure vessel containing an inert solvent and a halogenation catalyst with a quantity of bromine not less than the quantity actually intended to enter the aromatic compound, closing the vessel, feeding in a quantity of chlorine equal to at least half the molal proportion of the bromine employed, and maintaining the mass under reactive conditions until the desired degree of bromination has been attained.

7. The process of brominating a vat dyestuff, which comprises treating the same in a pressure vessel containing concentrated sulfuric acid and iodine with the substantially theoretical quantity of bromine for the desired reaction, closing the vessel, feeding in a quantity of chlorine equal to at least half the molal proportion of the bromine employed, and maintaining the mass under reactive conditions until the desired degree of bromination has been attained.

8. The process of brominating a vat dyestuff, which comprises treating the same in a pressure vessel containing concentrated sulfuric acid and iodine with the substantially theoretical quantity of bromine for the desired reaction, closing the vessel, heating the mass to a temperature between 50 and 85° C., feeding in chlorine until a gauge pressure between 40 and 150 pounds per square inch has been attained, and maintaining the mass under the said reactive conditions until the desired degree of bromination has been attained.

9. The process of producing a brominated-$\beta$-amino-anthraquinone, which comprises dissolving $\beta$-amino-anthraquinone in concentrated sulfuric acid, adding substantially two atomic ratios of bromine and a catalytic quantity of iodine, heating the mixture in a sealed vessel to a temperature between 75 and 85° C., passing in chlorine gas until a pressure between 40 and 50 pounds gage has been obtained, maintaining the mass under reactive conditions until reaction no longer takes place, then diluting the mass in water and recovering the brominated $\beta$-amino-anthraquinone produced.

JOHN H. SACHS.
FERDINAND W. PECK.